(12) United States Patent
Cassaday

(10) Patent No.: US 9,277,296 B2
(45) Date of Patent: Mar. 1, 2016

(54) KEYBOARD VIDEO DEVICE

(76) Inventor: Terry Cassaday, Mississauga (CA)

( * ) Notice: Subject to any disclaimer, the term of this patent is extended or adjusted under 35 U.S.C. 154(b) by 316 days.

(21) Appl. No.: 12/756,529

(22) Filed: Apr. 8, 2010

(65) Prior Publication Data

US 2011/0248824 A1  Oct. 13, 2011

(51) Int. Cl.
  *G08B 21/00*  (2006.01)
  *H04Q 9/00*  (2006.01)
(52) U.S. Cl.
  CPC ............. *H04Q 9/00* (2013.01); *H04Q 2209/47* (2013.01)
(58) Field of Classification Search
  CPC .............................. H04Q 2209/47; H04Q 9/00
  USPC ............................ 455/41.2; 312/223.1, 223.3
  See application file for complete search history.

(56) References Cited

U.S. PATENT DOCUMENTS

| | | | |
|---|---|---|---|
| 6,923,502 B2 | 8/2005 | Cassaday | |
| 6,964,370 B1 | 11/2005 | Hagale et al. | |
| 7,378,978 B2 | 5/2008 | Cassaday | |
| 7,498,950 B1 | 3/2009 | Ertas et al. | |
| 7,557,703 B2 | 7/2009 | Yamada et al. | |
| 7,626,505 B2 | 12/2009 | August et al. | |
| 2004/0165348 A1* | 8/2004 | Clark et al. | 361/686 |
| 2005/0099318 A1* | 5/2005 | Gilfix et al. | 340/825.19 |
| 2005/0187675 A1* | 8/2005 | Schofield et al. | 701/2 |
| 2006/0248699 A1* | 11/2006 | Sievenpiper et al. | 29/407.1 |
| 2008/0204248 A1 | 8/2008 | Cam Winget et al. | |
| 2009/0072977 A1 | 3/2009 | Johnson et al. | |
| 2009/0295733 A1 | 12/2009 | Stenbroten | |
| 2010/0057308 A1* | 3/2010 | Hill | 701/51 |
| 2010/0094645 A1* | 4/2010 | Carroll et al. | 705/2 |

* cited by examiner

*Primary Examiner* — Mark Rushing
(74) *Attorney, Agent, or Firm* — Eugene Gierczak

(57) ABSTRACT

This invention relates to a device for displaying information concerning a part such as a chair or keyboard tray having articulating components as well as a method of displaying information on the use of the components of a chair or keyboard tray. In particular this invention relates to a device for displaying video information concerning a part such as a chair or keyboard tray having articulating components as well as a method of displaying video information on the use of the components of a chair or keyboard tray.

17 Claims, 4 Drawing Sheets

KEYBOARD VIDEO DEVICE

FIELD OF INVENTION

This invention relates to a device for displaying information concerning a part such as a chair or keyboard tray having articulating components as well as a method of displaying information on the use of the components of a chair or keyboard tray. In particular this invention relates to a device for displaying video information concerning a part such as a chair or keyboard tray having articulating components as well as a method of displaying video information on the use of the components of a chair or keyboard tray.

BACKGROUND TO THE INVENTION

Current office type chairs are becoming more and more sophisticated in respect of the different adjustments that can be made to these types of chairs. For example both the chair back and the chair seat of an office chair may be adjustable to a number of different settings, heights and tilt angles. Typically each of these settings is adjusted by an individual chair control specific to each setting. Most of the chair controls are generally located below the chair seat.

Moreover many such office chairs can be tailor made for specific individuals. Generally such chairs will have different components which include different types and styles of casters, legs, pedestals, seats, firmness of the cushion in the seat, different types of chair backs, different chair adjustment means, different seat adjustment means, different height adjustment means, as well as different arms, headrests and adjustment of headrest to name just a few of the components. Accordingly individuals can select from these different components to assemble their chairs that are unique to them.

One of the drawbacks in the prior art chairs and particularly chairs which have been custom assembled relates to information about the different components in the chair as well as the adjustment means and controls that activate the adjustment means which are generally located under the seat of a chair.

Also it is not unusual for these chairs to be moved from one location to the other so that another individual may be using the chair that has been custom made for a specific individual, and be unfamiliar with the use of the controls or the chair adjustment means. Accordingly there is a need for an information system on the use of the components of the chairs and the like.

Furthermore office chairs would generally be located in front of a desk and in most cases have a computer screen, computer keyboard or the like on the desk. Many offices utilize a keyboard tray which can be located under the desk, on top of the desk, or attached to the pedestal of a computer screen, or a variety of other locations. Many of these keyboard trays include a number of components such as keyboard tray tilt adjustment, keyboard arm extension means, keyboard height adjustment means, and the like. Accordingly these articulating or adjustment functions can be made easier if there is some device which can impart information on the use of the keyboard tray and how to adjust it.

There is also a need for a device to impart information not only on the use of a keyboard tray but generally the chair that sits in front of the keyboard tray and a computer screen and the like. As stated before it is not unusual for chairs to be moved from one location to another and therefore it would be ideal if the device imparting the information would be able to automatically identify the different chair and the different components of the chair and impart the information to a person sitting in the chair. Moreover some chairs may be assembled and disassembled and then reassembled with different components. It would be ideal if the device imparting the information could automatically identify the different components and automatically display information concerning the different components of the chair and keyboard tray presented before it.

There have been a number of prior art chairs and keyboard tray devices which have addressed some of these issues.

For example U.S. Pat. No. 6,923,502 discloses a chair with switch controls for chair controlled directory. Moreover U.S. Pat. No. 7,378,978 teaches a chair or bed member having data storage of information regarding the chair or bed member. The chair or bed member further has a sensor which senses physical movement by a person using the chair or bed member to produce an output of the information from the data storage.

US2009/0295733A1 shows an ergonomic keyboard system components and method.

The prior art also teaches the use of radio frequency identification devices (RFID). For example U.S. Pat. No. 6,964,370B1 teaches smart furniture that automatically adjusts to a person's preferences based on an identification of the person. A person is equipped with an identification device such as a radio frequency identification device. The smart furniture includes a reader for the identification device to identify a person using the piece of furniture. The smart furniture may also include storage in which seating profiles of users are stored. The smart furniture may then receive a profile that matches the person using the furniture and sets adjustable features according to the profile. Seating profiles may be uploaded or downloaded from a remote storage using a wireless communication interface such as a wireless network interface.

Furthermore U.S. Pat. No. 7,557,703B2 teaches a position management system which includes two or more types of detection tags provided to objects whose positions are to be detected, detectors provided corresponding to the detection tags, and a position data processor in which the detection tags complement detection abilities for each other, in which a detection receives a signal from a detection tag provided to an object.

Apparatus and method for using RFID to track the use of a component within a device is shown in U.S. Pat. No. 7,498,950B1.

U.S. Pat. No. 7,626,505 relates to RF tags for tracking and locating travel bags while U.S. 2009/0072977A1 teaches a method and system of asset identification and tracking for enterprise asset management. Finally U.S. 2008/0204248A1 shows a RFID tag management and operation.

It is an aspect of this invention to provide a method of displaying information concerning components of a chair or keyboard tray comprising: placing at least one RFID tag on a component of the chair or keyboard tray; reading the presence of the RFID; and activating a device to display instructions concerning the component. This information can be either text or audio information or video information, with or without audio information or instruction.

It is a further aspect of this invention to provide for a keyboard tray comprising: a video device for displaying a video clip concerning: a chair having components selected from the group including fabric, pedestal, legs, casters, height adjustment means, seat adjustment means, back adjustment means, headrest, headrest adjustment means, arms, and arm adjustment means; and/or the keyboard tray having components selected from the group of keyboard tray tilt angle adjustment means, keyboard height adjustment means, keyboard arm adjustment means, keyboard tray distance adjustment means, and a component identification means associated with the components to permit activation of the video device so as to display the video clip on the component of the chair and keyboard tray.

A still further aspect of this invention relates to a device for displaying information concerning a part; the video device reading a component identification means associated with the part to permit activation of the device so as to display information concerning the part. This information can be either text or audio information or video information, with or without audio information or instruction. The device in one embodiment is a video device.

Yet another aspect of the invention relates to a method of displaying information concerning the assembly of a part having a plurality of different models, where each model includes a plurality of components, and where each model has at least one component with at least one RFID tag and associated information concerning said model, reading the at least one RFID associated with at least one component of the model and, a video device associated with the means to read the at least one RFID associated with the model for displaying information concerning the assembly of the components to assemble the model of the part.

It is an object of this invention to provide an improved video device for displaying information concerning a part. It is also an object of this invention to provide a method of displaying information on the use of components of a chair or keyboard tray. These and other objects and features of the invention shall now be described in relation to the following drawings.

DRAWINGS

DETAILED DESCRIPTION OF THE INVENTION

Like parts are given like numbers throughout the figures.

Figure 1:
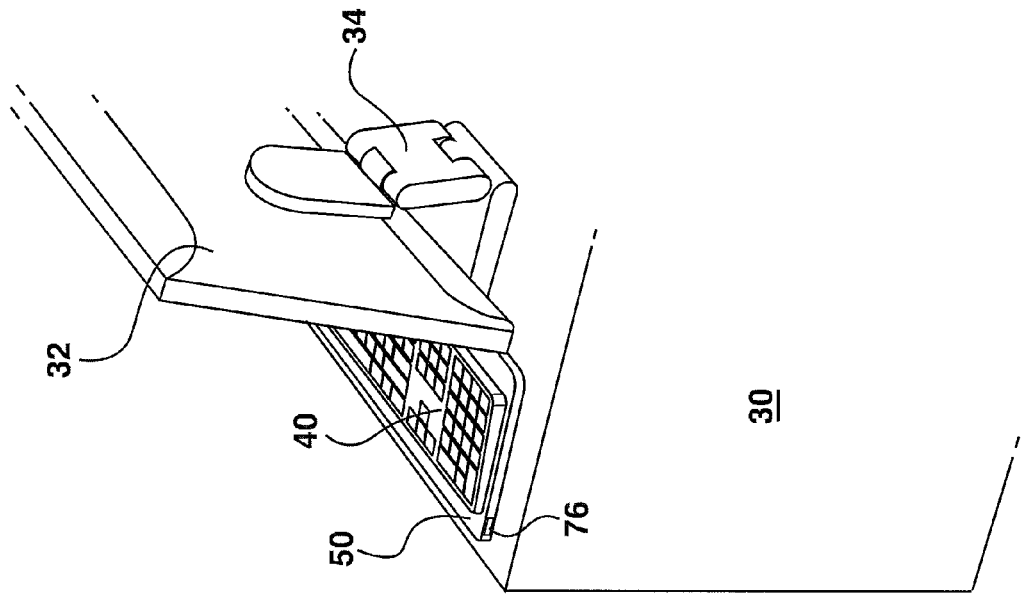
FIG. 1 is a perspective view of the invention showing a chair in front of a keyboard tray.
Figure 1:
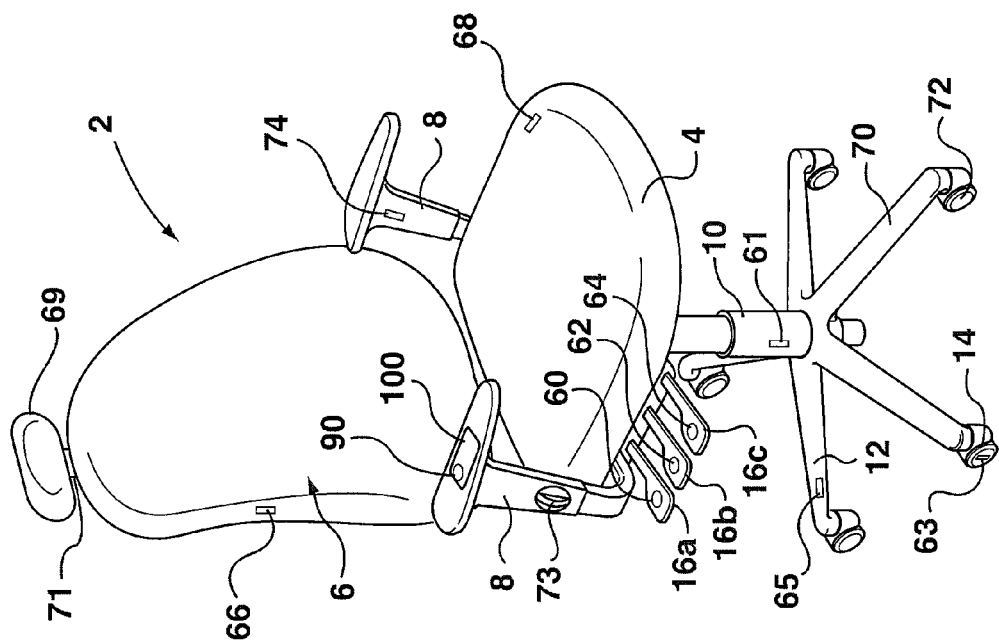
Figure 2:
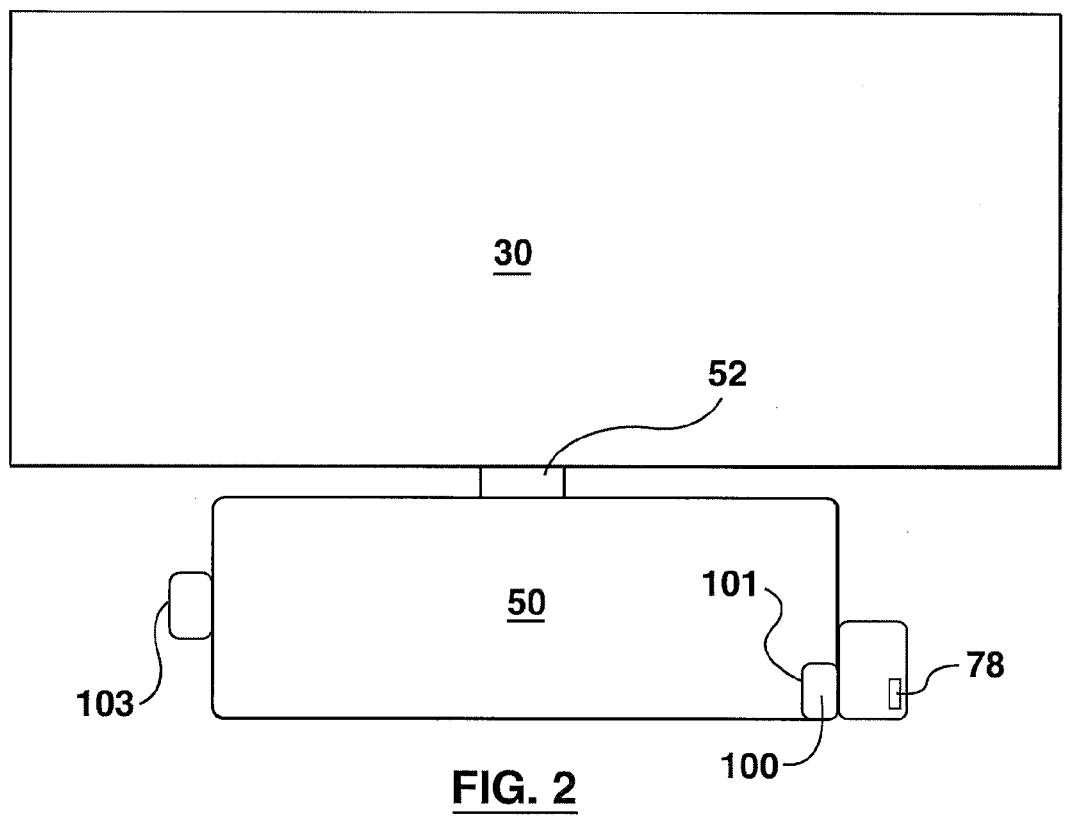
FIG. 2 is a top plan view showing a keyboard tray attached to the underside of a desk.

FIG. 1 generally illustrates a part which in the example shown in FIG. 1 comprises a chair 2 having a seat 4, back rest 6, a pair of arms 8, a pedestal or column 10, plurality of legs 12, and casters 14.

FIG. 1 also shows a plurality of controls 16 which are utilized to control various functions and adjustments of the chair 2. In particular the controls 16 comprise a seat adjustment means 16a, back adjustment means 16b, and height adjustment means 16c. These controls can be manipulated so as to adjust the seat, back rest or height of the seat.

The chair 2 is generally disposed in front of the desk 30 which has located on top thereof a computer video screen 32 resting on a video screen pedestal 34. FIG. 1 also illustrates the use of a keyboard 40 which in one embodiment can be placed on top of a keyboard tray 50.

Figure 3:
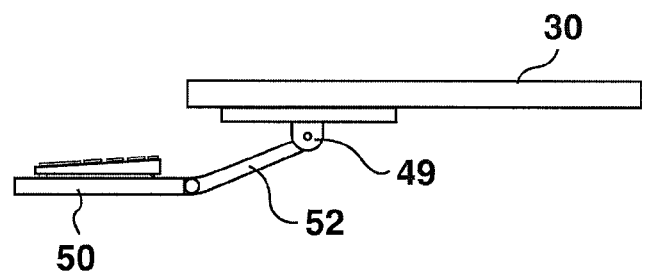
FIG. 3 is a side elevational view of FIG. 2 with the keyboard tray in a first position.
Figure 4:
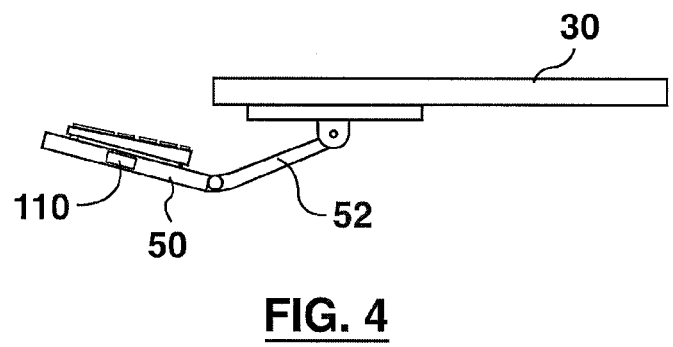
FIG. 4 is a side elevational view of FIG. 2 with the keyboard tray in a second position.
Figure 5:
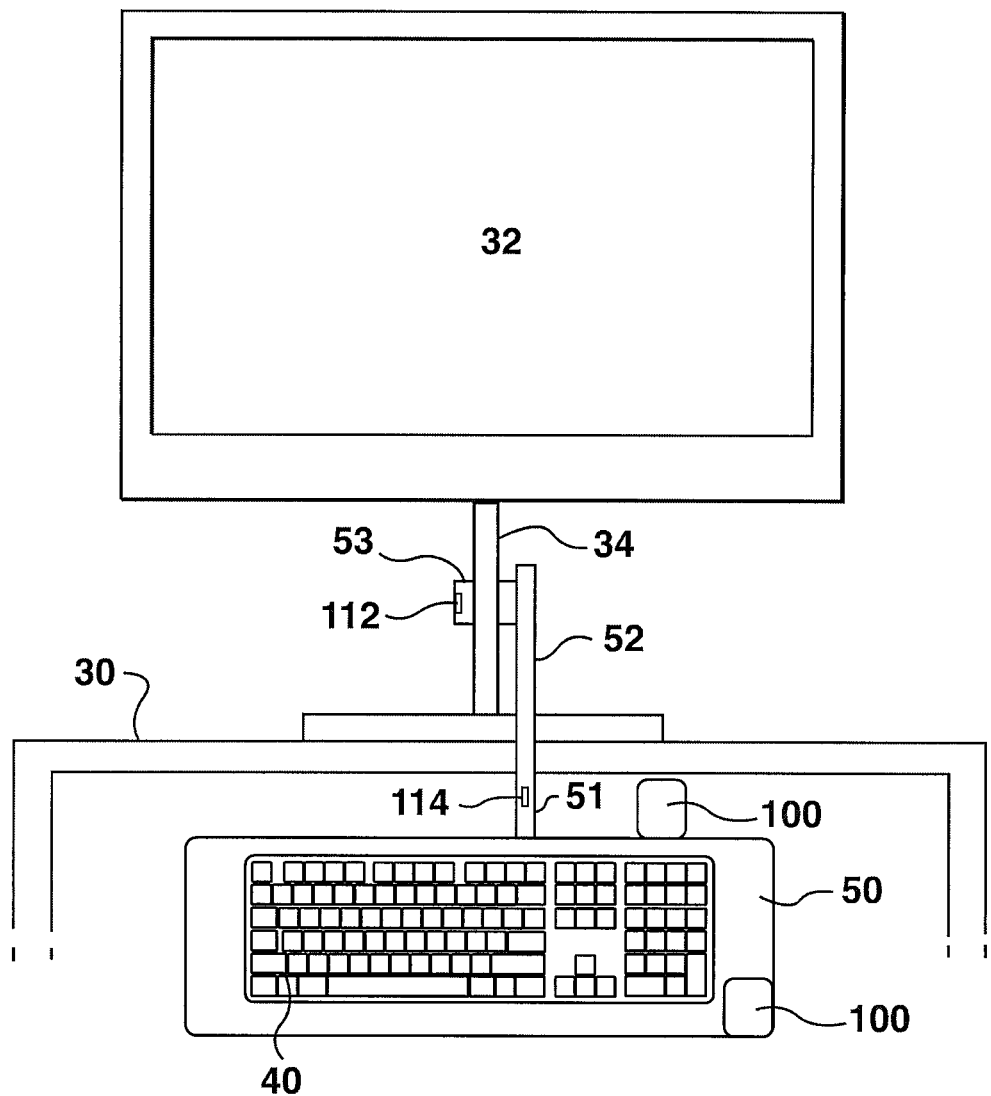
FIG. 5 is a front elevational view of the keyboard tray attached to a computer screen pedestal.
Figure 6:
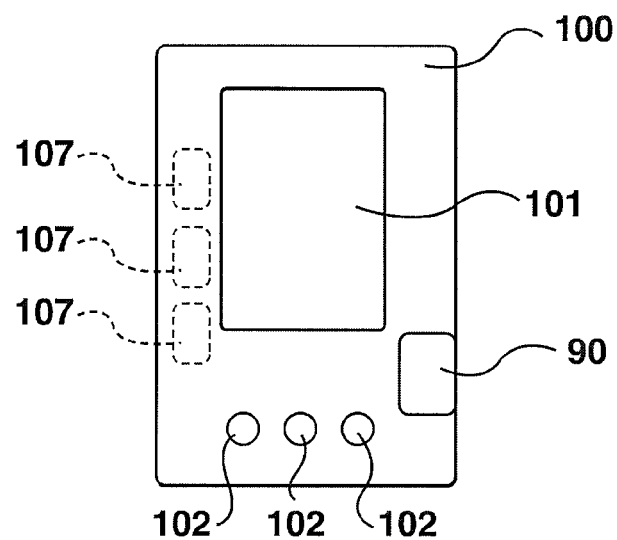
FIG. 6 is a top plan view of the video device.

As described above the chair 2 is in front of the desk 30 having a computer screen 32 with a computer screen pedestal 34. FIG. 1 also illustrates a computer keyboard 40 which can be located on top of a keyboard tray 50. Alternatively the keyboard tray 50 can be secured to the underside of a table by means of arms 52 as shown in FIGS. 3 and 4. Alternatively FIG. 5 shows another arrangement of the keyboard tray 50 which can be connected by means of an arm 52 secured to a computer screen pedestal 34.

The chair 2 as described previously comprises of a plurality of components namely seat 4, chair back 6, arms 8, column 10, legs 12, and casters 14 to name a few. Also the chair 2 includes other components that include fabric 67, seat adjustment means 16a, back adjustment means 16b and height adjustment means 16c, headrest 69 and headrest adjustment means 71 as well as arm adjustment means 73.

Each of these components can include a component identification means which generally comprises a radio frequency identification means. In particular the seat adjustment means 16a can include an RFID 60, the back adjustment means 16b can include RFID 62 and height adjustment means 16c can include an RFID 64. Each RFID or electronic tag is used to store identification data concerning that component.

An RFID tag may receive power from a reading device 90 which in one embodiment can be located within a video device 100 to be described herein. However an RFID may also operate on battery power depending on the implementation. Generally speaking RFID's use electronic tags and labels on parts or products along with wireless scanners and other devices to track the products.

In other words each of the RFID 60, 62 and 64 provide a unique radio frequency identification identifying the particular component which is used in assembling the chair 2.

As described herein many office chairs can be tailor made such that the control 16a, 16b and 16c, may control other functions or adjustments or articulations of the chair 2 depending on the wishes of the user.

Moreover the seat 4 may also be selected such that the firmness of the seat can be soft or hard. The seat 4 may have the appropriate RFID 68 which will identify the particular hardness or softness of the seat. Likewise RFID 65 can identify the type of legs 12 that are utilized in a chair 2 while RFID 63 can identify the type of casters 14 that are utilized while RFID 61 produce a unique radio frequency to identify the particular type of pedestal 10 that is utilized. Also RFID 74 identifies the type of arm 8 that is used or alternatively the arm adjustment means 73. Furthermore the chair back 6 has an RFID 66 identifying the type of back which is utilized.

A reading device 90 is utilized to read the various signals from the plurality of RFIDs described above and activate the video device 100. The reading device can comprise a scanner well know to those persons skilled in the art. The reading device or means 90 can be part of the video device 100, or separate from the video device 100, or a part of the keyboard tray 50. The reading device or scanner 90 can be attached to the keyboard device or part of the video device associated with the keyboard tray 50.

In one embodiment the video device 100 can be disposed on the arm 8 of the chair 2 whereby the user could activate a button 104 to turn the video device 100 on or off as well as activate the forward button 106 or reverse button 102 so as to scroll through the various text or audio messages or video clips that can be displayed on the video device screen 101.

Accordingly this invention describes a device 100 for displaying information concerning a part. The information to be displayed can be text, audio, graphic, picture, video or a combination thereof. The part as described can be any part, but in the invention described above relates to a chair 2. The device described herein can be any device which imparts the information referred to above, but in one embodiment relates to a video device 100 that reads the component identification means, namely the RFIDs described above associated with the part or chair 2 to permit activation of the video device 100 so as to display information concerning the part or chair 2. In one example the video screen 100 may have information on the fabric 67 of the chair or which levers 60, 62, 64, activate the height adjustment, seat adjustment or back adjustment as described. Furthermore the video device 100 can provide information on the type of seat 4 that is utilized or the type of legs 12 or arms 80 that are utilized as well as the manner of use and general information concerning these components.

The video device 100 includes a memory 103 which can include the various video clips concerning the use of the components as described as well as general information concerning the components.

The video device 100 can also include a CPU 105 as well as software instructions 107 so as to activate the video device 100 depending on the RFIDs that are utilized. The software instructions can be programmed to display the information in a particular sequence.

Figure 7:
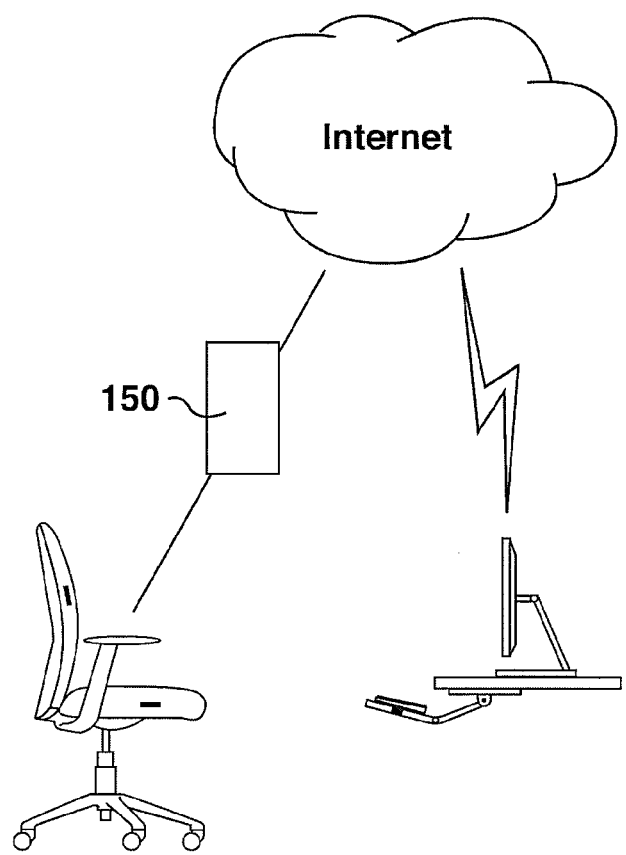
FIG. 7 is a representative view of the invention communicating with the internet.

The information concerning the components can either be fixed in memory or downloaded to the internet as shown in FIG. 7. In this case a server or computer 150 is connected to the internet whereby updated information can be received by the computer or to incorporate new models of chairs and thereby update the information residing in memory 103. This information may be delivered wirelessly. Moreover the invention described herein can incorporate one or more manufacturers of chairs, in which case it would be necessary to apply different RFIDs to the components of the chair. Accordingly it would be easier to track a large number of chairs at large institutions, whereby one master server or video device could be used to track and store data relating to all of the chairs.

The video device 100 can be programmed to sequentially display information about each component of the chair.

In another embodiment of the invention the video device 100 can be attached to or incorporated in the keyboard tray 50 as shown in FIGS. 2, 3, 4, and 5. The keyboard tray 50 can be attached under a desk 30, or above the desk as shown in FIG. 5 and described above.

The keyboard tray 50 can include an articulating arm 52. The arm 52 can be adjusted from a first position as shown in FIG. 3 to another position as shown in FIG. 4. Moreover the height of the keyboard tray 50 from the desktop 30 can be adjusted by means of loosening and then tightening clamping means 53 along the shaft of the computer screen pedestal 34. Furthermore the keyboard tray 50 can be adjusted so that the distance between the keyboard 50 and the user can be lengthened or shortened by means of adjusting the telescoping arm 51, 52. Moreover the keyboard tray tilt angle adjustment means can be adjusted as shown in FIG. 3 and FIG. 4.

Accordingly another embodiment of this invention relates to a keyboard tray 50 comprising a device 100 for displaying information about a part. This information can be text, audio, graphic, photographic, video or a combination thereof. In particular the part can comprise a keyboard tray or chair.

In particular another embodiment of this invention relates to a keyboard tray 50 comprising a video device 100 for displaying video clips concerning:
(a) a chair 2 having components selected from the group which include fabric 67, pedestal 10, legs 12, casters 14, seat adjustment means 16a, back adjustment means 16b, height adjustment means 16c, arms 8, arm adjustment means 73 and/or
(b) the keyboard tray 50 which has components selected from the group of keyboard tray tilt angle adjustment means 49, keyboard height adjustment means 53, and keyboard tray distance adjustment means 51, 52.

The keyboard tray also includes component identification means or RFID 76 so as to identify the type or brand of keyboard tray 50 as well as RFID 110 to identify the keyboard tray tilt angle adjustment means 49, RFID 112 to identify the keyboard height adjustment means 53 and RFID 114 to identify the keyboard tray distance adjustment means. Each of the RFIDs are associated with the components of the keyboard tray to permit activation of the video device 100 so as to display the video clip associated with the component of the keyboard tray, concerning the use of the adjustment of each articulating component of the keyboard tray 50.

Alternatively the video device 100 can store and display information concerning the use of the adjustable members, namely the keyboard tray tilt angle adjustment means 49, to the keyboard height adjustment means 53 and the keyboard tray distance adjustment means. In this case the video device 100 would be activated and there would be information, preferably video giving video instructions on how to use the adjustment mechanisms of the keyboard tray, without the RFID. In other words this invention also describes another embodiment comprising a video display instruction system associated with an articulating keyboard tray having at least one adjustable member, the video display system having means for storing and displaying information concerning the use of the at least one adjustable member of the articulating keyboard tray.

A further embodiment of this invention comprises a video device 100 that stores and displays information concerning the use of the adjustable members, namely the adjustable controls of a chair, namely a seat adjustment means 16a, back adjustment means 16b, and height adjustment means 16c as previously described. In this case the video device 100 would be activated and there would be information, preferably video giving video instructions on how to use the adjustment mechanisms of the chair, without the RFID. In other words this invention also describes another embodiment comprising a video display instruction system associated with an articulating keyboard tray or chair having at least one adjustable member, the video display system having means for storing and displaying information concerning the use of the at least one adjustable member of the articulating chair or chair and keyboard tray 50 without the RFIDs.

The video device 100 can be built into 101 or attached 103 to the keyboard tray 50, chair 2 or desk 30. The video device comprises of the memory 103, CPU 105 and software instructions 107. The memory 103 contains the described information or video clips of a plurality of components of the keyboard tray 50 wherein the video device 100 selects the information concerning the actual components of the keyboard tray that are actually being used when the video device 100 reads the RFIDs. The video device 100 includes video clips of the components which are used to assemble the keyboard tray and include video clips which can be either fixed in to memory 103 or accessed wirelessly either through the internet or cell phone. The video device 100 can also include text messaging which will appear on the video device screen 101. The video device can also include the information about the chair as previously described.

Accordingly the invention described herein also relates to a method of displaying information concerning components of a chair 2 or keyboard tray 50 comprising:
(a) placing at least one RFID tag on a component of the chair 2 or keyboard tray 50;
(b) reading the presence of the RFID;
(c) activating a video device 100 to display video instructions concerning the component.

The method described herein can also be utilized in the assembling of any parts such as a barbecue or the like. In other words it is quite usual for individuals to purchase a barbecue having components with instructions. The invention herein would comprise of attaching RFID to the various components and then including a video device 100 either incorporated into the barbecue or as a separate unit. Any part can be identified in this manner in order to either provide information concerning the part or steps or sequence in assembling of the part or activation of the various controls to adjust or use the part.

Another embodiment of the invention relates to a method of displaying information concerning the assembly of a part having a plurality of different models, where each model includes a plurality of components, and where each model has at least one component with at least one RFID tag and associated information concerning said model, reading the at least one RFID associated with at least one component of the model and, a video device associated with the means to read the at least one RFID associated with the model for displaying information concerning the assembly of the components to assemble the model of the part. The video device would have a plurality of videos stored in a memory, one for each model. Furthermore at least one RFID tag describes the model, a second RFID describes options for a particular model and a third RFID provides a language selection.

In another embodiment of the invention an iPod, iPad or Blackberry or other separate video device can be utilized in association with the RFIDs so as to display the information on such devices with the appropriate application software imbedded therein.

The method described herein further illustrates attaching the video device onto the keyboard tray 50. The method further comprises placing a plurality of RFID tags on a plurality of components of the chair 2 and keyboard tray 50 respectively so that each RFID tag is associated with a single feature of the components respectively whereby the video screen 101 displays video instructions on the components and the use of the components of the chair 2 or keyboard tray 50. The method further comprises a memory having video clips for showing instructions on the adjustment of the chair 2 or keyboard tray 50.

The method as described herein permits chairs to be moved and/or components reconfigured and the video device 100 still displays the correct video instructions on the use of the components of the chair 2 and keyboard tray 50.

The video device provides instructions on the use of the articulation of the keyboard tray 50.

Moreover the method describes a video device which includes a CPU 105, memory 103, and software instructions 107 so as to permit programming to play a video clip displaying how the keyboard tray 50, arm 52, chair 2 and other accessories can be used together for optimal ergonomic positions.

Furthermore the invention as described herein can also be used to allow for different languages where the instructions can be stored in the video device 100 and all needed languages for export around the world and the RFID affixed to the product components identifies the product version and the correct language.

Although the preferred embodiment as well as the operation and use have been specifically described in relation to the drawings, it should be understood that variations of the preferred embodiments can be achieved by a person skilled in the trade without departing from the spirit of the invention as claimed herein.

I claim:

1. A method of displaying information concerning components of a chair or keyboard tray comprising:
   (a) placing a plurality of RFD tags on a plurality of components of the chair and the keyboard tray, respectively, so that each RFID tag is associated with a single feature of the components respectively;
   (b) assembling the chair from a selected subset of chair components, or assembling the keyboard tray from a subset of keyboard components;
   (c) reading the presence of the RFD with a scanner;
   (d) activating a device that communicates with the scanner, said device including a CPU, program instructions and memory so as to permit programming to provide information on the use of the components of the chair and keyboard tray, and how the assembled chair or the assembled keyboard tray can be used together for optimal ergonomic positions;
   (e) said memory having video clips for showing instructions on the adjustment of the chair or keyboard tray and permits chair to be moved or components reconfigured and the video device still displays the correct video instructions on the use of the components of the chair and keyboard tray.

2. The method as claimed in claim 1 further attaching the device onto the keyboard tray, and the information is either text, audio, video or combination, and the device comprises a video device.

3. The method as claimed in claim 2 wherein said scanner is a part of the video device or separate from the video device.

4. The method as claimed in claim 3 wherein said video device comprises a memory having video clips for showing instructions on the adjustment of the chair or keyboard tray.

5. The method as claimed in claim 4 wherein said video device permits chairs to be moved or components reconfigured and the video device still displays the correct video instructions on the use of the components of the chair and keyboard tray.

6. A method of displaying information concerning components of a chair or keyboard tray comprising:
   (a) placing a plurality of RFID tags on a plurality of components of the chair and keyboard tray, respectively, so that each RFID tag is associated with a single feature of the components, respectively;
   (b) activating a video device to display information concerning the component and the information is either text, audio, video or combination, and the device comprises a video device;
   (c) a scanner that reads said RFD tags, the scanner being a part of the video device or separate from the video device;
   (d) whereby the video device displays video information on the components and use of the components of the chair or keyboard tray;
   (e) wherein said video device comprises a memory having video clips for showing instructions on the adjustment of the chair or keyboard tray and permits chairs to be moved or components reconfigured and the video device still displays the correct video instructions on the use of the components of the chair and keyboard tray, and wherein said video device provides instructions on the use of the articulation of the keyboard tray and said video device including a CPU, program instructions, and memory so as to permit programming to play a video clip displaying how the keyboard tray, chair and other accessories can be used together for optimal ergonomic positions.

7. The method as claimed in claim 6 wherein said video device includes video information which is either fixed into the memory or downloadable to the memory by wireless means.

8. The method as claimed in claim 7 wherein said video device can communicate with the internet.

9. A video device for displaying information concerning components in an assembled chair or assembled keyboard tray from a plurality of models and permitting the chair to be moved or the components reconfigured; the video device reading a component identification means associated with each component to permit activation of the video device so as to identify the model and display information and said video device including a CPU, program instructions and memory so as to permit programming to provide information on the use of the components of the chair and keyboard tray, and how the assembled keyboard tray and assembled chair can be used together for optimal ergonomic positions, said memory having video clips for sharing instructions on the adjustment of the chair or keyboard tray and permits the chair to be moved or components reconfigured and the video device still displays the correct video instructions on the use of the components of the chair and keyboard tray.

10. The video device as claimed in claim 9 wherein the component identification means comprises an RFID.

11. The video device as claimed in claim 10 wherein the video device is attached to the Keyboard tray and the chair has a plurality of components, the component identification means comprising an RFID means identifying the actual components of the chair, and wherein the video device senses the RFID means and displays information concerning the actual components of the chair.

12. The video device as claimed in claim 11 wherein the RFID means comprises an RFID for each component and where the video device sequentially displays information about each component of the chair.

13. A keyboard tray comprising:
(a) a video device for displaying a video clip concerning:
  (i) a selected chair from a plurality of chairs having components selected from the group including fabric, pedestal, legs, casters, height adjustment means, seat adjustment means, back adjustment means, headrest, headrest adjustment means, arms, and arm adjustment means; or
  (ii) the keyboard tray having components selected from the group of keyboard tray tilt angle adjustment means, keyboard height adjustment means, keyboard arm adjustment means, keyboard tray distance adjustment means,
(b) component identification means associated with a single feature of the components respectively to permit activation of the video device so as to display the video clip on the optimal adjustment of the component of the selected chair relative the keyboard tray from the plurality of chairs;
(c) said video device including a CPU, program instructions and memory so as to permit programming to play a video clip displaying how the keyboard tray and chair can be used together for optimal ergonomic positions;
(d) said memory having video clips for showing instructions on the adjustment of the chair or keyboard tray and permits chair to be moved or components reconfigured and the video device still displays the correct video instructions on the use of the components of the chair and keyboard tray.

14. The video device as claimed in claim 10 wherein the video device is built into or attached to the keyboard tray, chair or a desk.

15. The video device as claimed in claim 13 wherein said video device is built into or attached to the keyboard tray.

16. The video device as claimed in claim 15 wherein said video device comprises a CPU, software instructions, and the memory containing the video clips of a plurality of components of chairs and keyboard trays, wherein said video device selects the information concerning the actual components of the chairs or keyboard trays when said video device reads the RFIDs.

17. The video device as claimed in claim 16 wherein said video clip is either fixed into the memory or accessed wirelessly either through the internet or a cell phone.

* * * * *